United States Patent
Yun

(10) Patent No.: US 7,382,259 B2
(45) Date of Patent: Jun. 3, 2008

(54) IMAGE FORMING APPARATUS WITH RADIO FREQUENCY IDENTIFICATION FUNCTION AND METHOD OF USING THE SAME

(75) Inventor: Tae-jung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 11/120,984

(22) Filed: May 4, 2005

(65) Prior Publication Data
US 2005/0264421 A1    Dec. 1, 2005

(30) Foreign Application Priority Data
May 25, 2004  (KR) .................. 10-2004-0037319

(51) Int. Cl.
*G08B 13/14*  (2006.01)
(52) U.S. Cl. .................. 340/572.1; 340/572.4
(58) Field of Classification Search .......... 340/572.1, 340/572.4, 572.9, 568.1, 571, 573.1, 286.01; 455/41.2, 414.1, 456.1; 235/436, 462.01, 235/383, 385
See application file for complete search history.

(56) References Cited

U.S. PATENT DOCUMENTS

| | | | |
|---|---|---|---|
| 6,129,276 A * | 10/2000 | Jelen et al. | 235/383 |
| 6,379,058 B1 | 4/2002 | Petteruti et al. | |
| 6,766,947 B2 * | 7/2004 | Wan et al. | 235/383 |
| 6,913,199 B2 * | 7/2005 | He | 235/454 |
| 6,937,154 B2 * | 8/2005 | Zeps et al. | 340/573.1 |
| 7,066,388 B2 * | 6/2006 | He | 235/383 |
| 7,132,947 B2 * | 11/2006 | Clifford et al. | 340/572.3 |
| 7,149,503 B2 * | 12/2006 | Aarnio et al. | 455/414.1 |

FOREIGN PATENT DOCUMENTS

| | | |
|---|---|---|
| JP | 2002-297335 | 10/2002 |
| JP | 2002-337426 | 11/2002 |
| JP | 2004-94589 | 3/2004 |
| JP | 2005277658 A * | 10/2005 |
| KR | 2000-67222 A | 11/2000 |
| KR | 2002-13175 A | 2/2002 |

OTHER PUBLICATIONS

KR Office Action dated Feb. 28, 2006 issued in KR 2004-37319.

* cited by examiner

*Primary Examiner*—Van T. Trieu
(74) *Attorney, Agent, or Firm*—Stanzione & Kim, LLP

(57) ABSTRACT

A method of forming an image that corresponds to an information item about an article having a radio frequency identification (RFID) tag. The image forming apparatus receives information about the article stored in the RFID tag, requests, from a server, one or more detailed information items about the article that correspond to the received information, and receives the requested one or more detailed information items. The image forming apparatus forms one or more images that correspond to the received one or more detailed information items. The server stores the one or more detailed information items. Accordingly, the image forming apparatus can obtain information about the article at any time.

40 Claims, 3 Drawing Sheets

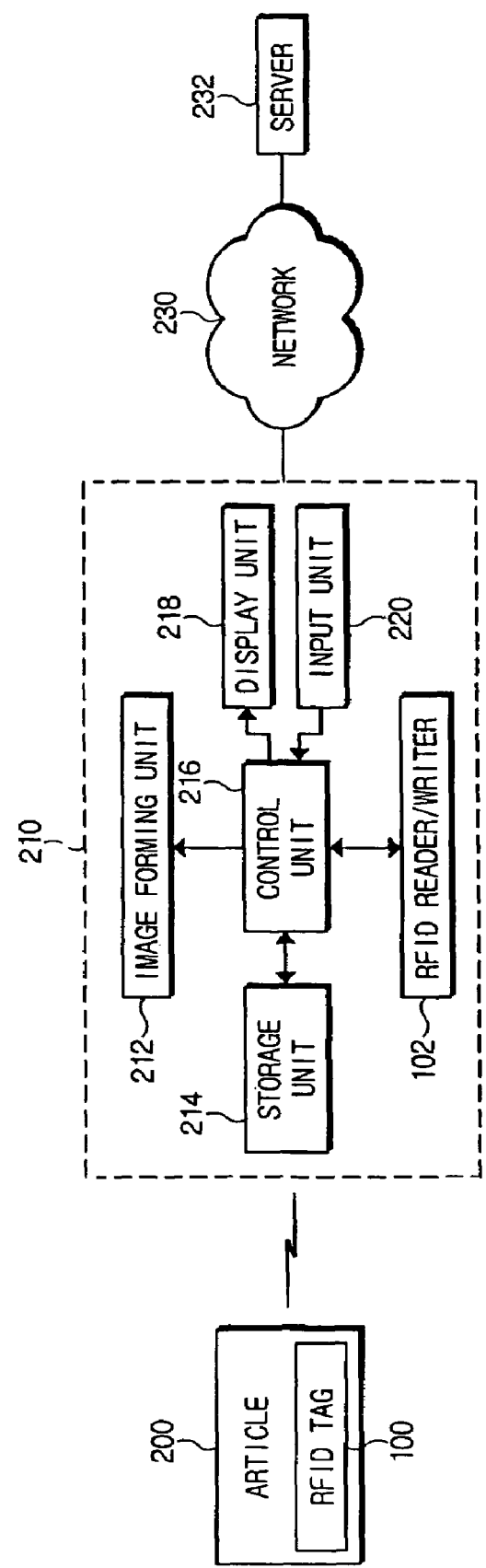

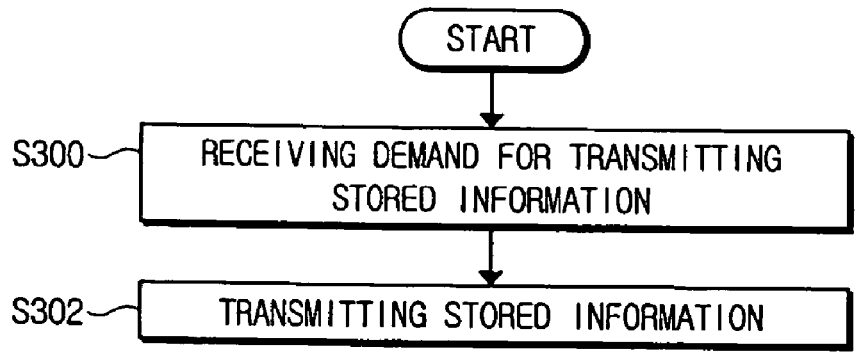
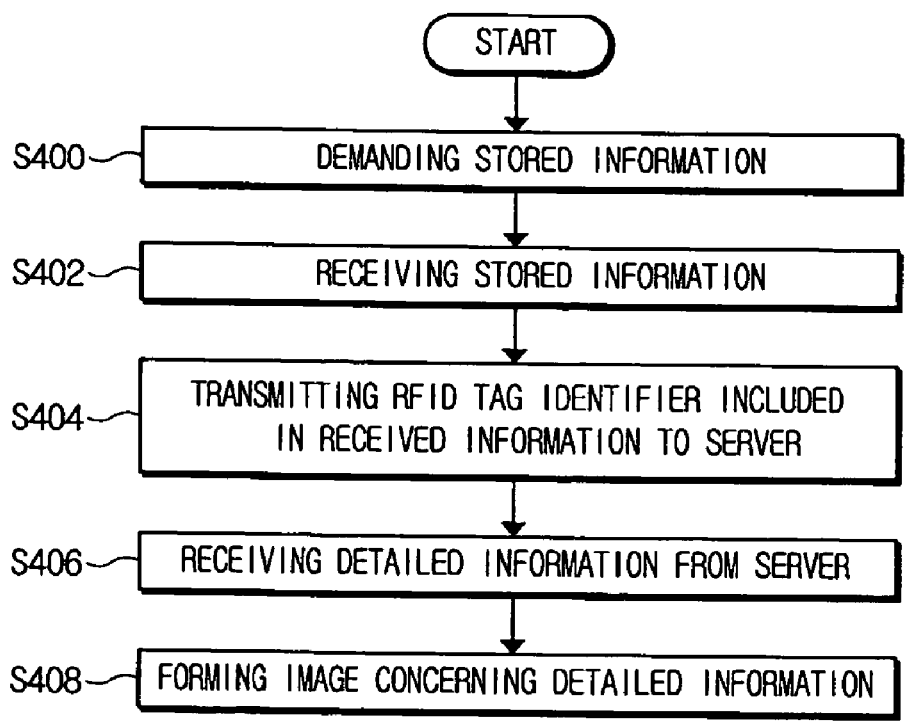

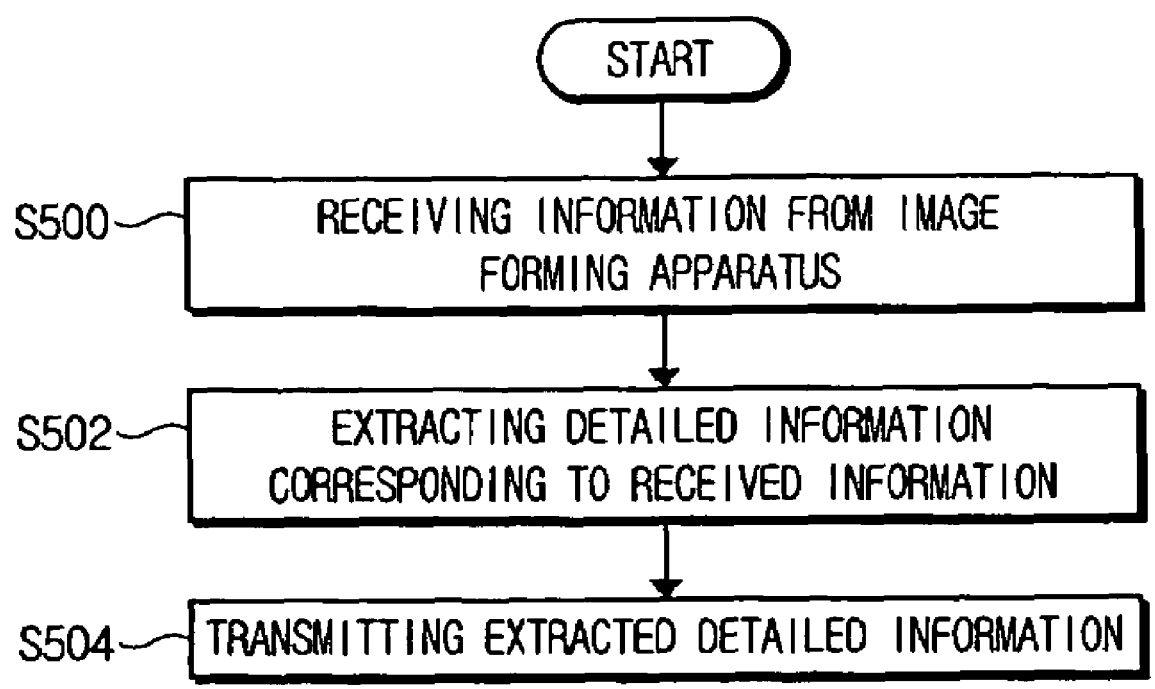

IMAGE FORMING APPARATUS WITH RADIO FREQUENCY IDENTIFICATION FUNCTION AND METHOD OF USING THE SAME

CROSS-REFERENCE TO RELATED APPLICATIONS

This application claims the benefit of Korean Patent Application No. 2004-37319 filed on May 25, 2004, in the Korean Intellectual Property Office, the disclosure of which is incorporated herein in its entirety by reference.

BACKGROUND OF THE INVENTION

1. Field of the Invention

The present general inventive concept relates to an image forming apparatus and in particular to an image forming apparatus having a radio frequency identification (RFID) function.

2. Description of the Related Art

At present, various apparatuses and/or articles employ an RFID technique. The RFID technique has been developed in accordance with changes in manufacturing modes, consumer consciousness of products, progress of culture and technique, and a demand for removing disadvantages of barcodes and magnetic cards. An RFID tag is a type of "contactless card," i.e., the RFID tag does not require contact to serve its identification function.

The RFID tag is characterized in that a user is not required to insert the RFID tag into a card reader, the RFID tag is not be subjected to friction or damage because no mechanical contact is needed for identification (as opposed to a contact type card), and the RFID tag is seldom affected by contamination from an environment. An antenna continuously emits radio waves and the RFID tag, which stores an ID and data, transmits the ID and data to the antenna when it enters into an area of the radio waves transmitted by the antenna. In this event, the antenna converts the ID and data into a signal and transmits the signal to a personal computer (PC). The PC compares the signal with information previously stored in a data base (DB). While the frequency used in this event ranges from about 10 kHz to 300 GHz, a low-frequency (e.g., 134.2 kHz) is typically used. Hereinbelow, various features of the RFID tag are described.

First, various RFID tags can be recognized rapidly and at the same time, thereby saving processing time. Due to this advantage, RFID tags are a more effective substitute for barcodes and magnetic tags in a material flow field. Second, the RFID tag can be readily applied depending on a systematic characteristic or an environmental condition, and an application area of the RFID tag is large because a detection distance is long. The RFID tag (card) is a substitute for a contact type smart card, which has been employed in a conventional parking control system. Third, a life span of the RFID tag is long because the RFID tag has superior environmental resistance. Since a user is not required to insert an RFID tag card into a reader and there is no mechanical contact, frictional damage of the RFID tag card does not result, and an error rate of the RFID tag card is low under adverse conditions of dust, humidity, temperature, rain, or the like. Accordingly, the RFID tag can be frequently applied to a system in an open area. Fourth, the RFID tag need not be blocked by non-metallic materials. Fifth, the RFID tag can be used to recognize a body moving at a high speed. Because a time period required from an emission of a radio wave of an antenna until the radio wave is recognized is merely about 0.01 to 0.1 sec, the RFID tag is capable of being installed and adapted to a parking control system or an automatic fare collection system of a highway or tunnel. Due to various advantages as described above, the RFID technique is applied to various apparatus and systems.

SUMMARY OF THE INVENTION

Accordingly, the present general inventive concept provides a system to apply an RFID technique to an image forming apparatus, and a method thereof.

The present general inventive concept also provides a system and a method that allow a user of the image forming apparatus to easily obtain required information at any time using the RFID technique.

The present general inventive concept also provides a system and a method that enables image formation to be implemented using the information the user of the image forming apparatus obtains using the RFID technique.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing a method of forming an image that corresponds to an information item about an article having a radio frequency identification (RFID) tag in a system having an image forming apparatus and the article, the method comprising receiving information about an article from an RFID tag, requesting, from a server, one or more detailed information items about the article that correspond to the received information of, receiving the requested one or more detailed information items from the server, and forming one or more images that correspond to the received one or more detailed information items.

The foregoing and/or other aspects and advantages of the present general inventive concept may also be achieved by providing an image forming apparatus to form an image that corresponds to an information item about an article having a radio frequency identification (RFID) tag, comprising an RFID reader/writer to receive information about an article stored in an RFID tag, a control unit to request, from a server, one or more detailed information items about the article that correspond to the received information and to receive the requested one or more detailed information items from the server, and an image forming unit to form one or more images that correspond to the received one or more detailed information items.

The foregoing and/or other aspects and advantages of the present general inventive concept may also be achieved by providing an image forming system, comprising an article having an RFID tag attached thereto, an image forming apparatus to request one or more detailed information items associated with information received from the RFID tag about the article, to receive the requested one or more detailed information items, and to form one or more images according to the received one or more detailed information items, and a server to transmit the requested one or more detailed information items to the image forming apparatus.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic view illustrating an RFID tag and an RFID reader/writer;

FIG. 2 is a schematic view illustrating an RFID system including an article with the RFID tag of FIG. 1 attached thereto, an image forming apparatus in communication with the RFID reader/writer of FIG. 1, and a server according to an embodiment of the present general inventive concept;

FIG. 3 is a schematic view illustrating operation of the RFID tag of FIG. 2 according to an embodiment of the present general inventive concept;

FIG. 4 is a schematic view illustrating operation of the image forming apparatus of FIG. 2 according to an embodiment of the present general inventive concept; and FIG. 5 is a schematic view illustrating operation of the server of FIG. 2 according to an embodiment of the present general inventive concept.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates an RFID tag 100 and an RFID reader/writer 102. Hereinbelow, functions of the RFID tag 100 and the RFID reader/writer 102 are described in detail.

The RFID tag 100 transmits information stored therein to the RFID reader/writer 102 in response to a request received from the RFID reader/writer 102. The RFID tag 100 contains a radio frequency (RF) chip and transceives information wirelessly. The RFID tag 100 may be an active tag or a passive tag. The active tag contains a battery and may employ memories of various sizes. In addition, the active tag has an information transmission/reception coverage in the range of 30~100 m because a battery is contained therein. On the other hand, the passive tag has a relatively short information transmission/reception coverage as compared to the active tag because the passive tag does not contain a battery. However, the passive tag is advantageous since its construction is simple, its price is inexpensive, and its life span is relatively long.

The RFID reader/writer 102 reads data stored in the RFID tag 100 or transmits data to the RFID tag 100.

FIG. 2 illustrates a system to form an image in an image forming apparatus by receiving information about an article having the RFID tag 100 (same as FIG. 1) attached thereto from a server and receiving information from the RFID tag 100 according to an embodiment of the present general inventive concept.

The system comprises an article 200 having the RFID tag 100 attached thereto, an image forming apparatus 210 in communication with the RFID reader/writer 102 (same as FIG. 1), a server 232, and a network 230 to connect the image forming apparatus 210 with the server 232.

Hereinbelow, the system of FIG. 2 will be described in terms of the image forming apparatus 210. The RFID reader/writer 102 emits radio waves to the RFID tag 100 according to a setting to request information from the RFID tag 100. The setting may be determined by a user. Once the information is received from the RFID tag 100, the RFID reader/writer 102 may display the information on a display unit 218 or store the information in a storage unit 214. The stored information can be read at any time in response to a request received from the user at an input unit 220 of the image forming apparatus 210. The storage unit 214 can additionally store printing options or printing data to be used by the image forming apparatus 210. The printing options of the image forming apparatus 210 may be selected by the user. The storage unit 214 can temporarily store the information received from the RFID tag 100.

The user can select information to be displayed by the display unit 218 using the input unit 220. The selected information is input to the control unit 216 through the input unit 220. The display unit 218 can display the printing options or the information received from the RFID tag 100 in response to a control command received from the control unit 211. The reason for the selection of desired display information is described below. The image forming unit 212 performs image formation of the printing data in response to a control command received from the control unit 216.

Hereinbelow, the operation of the article 200 and the control unit 216 of the image forming apparatus 210 corresponding to the RFID reader/writer 102 and the server 232 will be described.

The article 200 may include a visiting card, a poster, an agricultural product, etc. Additionally, the article 200 may include a variety of different objects. It should be understood that the articles described below are merely exemplary and are not intended to limit the scope of the present general inventive concept.

In the case in which the article 200 is the visiting card having the RFID tag 100 attached thereto, the RFID tag 100 transmits information items stored therein to the RFID reader/writer 102. The information items included in the RFID tag 100 of the visiting card may comprise, for example, a name, a phone number, a company name, an e-mail address, a company homepage address, etc. The RFID reader/writer 102 transmits the information items received from the RFID tag 100 to the control unit 216. If one or more information items about the received information items (e.g., the company name) are additionally required beyond the above-mentioned received information items, the control unit 216 requests the one or more additionally required information items from the server 232. The request for the additionally required information items can be controlled by the user of the image forming apparatus 210. The server 232 stores information items of the visiting card and about the visiting card. The server 232 can transmit a list of additionally required information items about the company and/or the actual additionally required information items about the company stored therein to the control unit 216 in response to the request from the control unit 216. The information items about the company transmitted by the server 232 to the control unit 216 may include an introduction of company, a business field of company, news about the company, or the like.

In the case in which the article 200 is the poster having the RFID tag 100 attached thereto, the RFID tag 100 transmits information items stored therein to the RFID reader/writer 102. The information items contained in the RFID tag 100 of the poster may include, for example, a movie title, information about a leading actor/actress, and a release date. The RFID reader/writer 102 transmits the information items received from the RFID tag 100 to the control unit 216. When one or more information items about the poster are required in addition to the above-mentioned information items that are received from the RFID tag 100, the control unit 216 requests the one or more additional information items from the server 232. The server 232 stores information items of the poster and about the poster. The server 232 can transmit a list of the information items about the poster and/or the actual information items about the poster stored therein to the control unit 216 in response to the request from the control unit 216. The information items about the poster that are stored in the server 232 may include, for example, information required to understand the movie such as still pictures or a process of production of the movie.

In the case in which the article 200 is the agricultural product having the RFID tag 100 attached thereto, the RFID tag 100 transmits information items stored therein to the RFID reader/writer 102. The information items contained in the RFID tag 100 of the agricultural product may include, for example, a producing district, a producer name, a price, and a distribution term of the product. The RFID reader/writer 102 transmits the information items received from the RFID tag 100 to the control unit 216. If one or more information items about the agricultural product are required in addition to the above-mentioned information items that are received from the RFID tag 100, the control unit 216 requests the one or more additional information items from the server 232. The server 232 stores information items of the agricultural product and about the agricultural product. The server 232 can transmit a list of the information items about the agricultural product and/or the actual information items about the agricultural products stored therein to the control unit 216 in response to the request from the control unit 216. The information items about the agricultural product that are stored in the server 232 may include, for example, greetings of the producer, image(s) showing a process of cultivation, information about a distribution procedure, etc.

The control unit 216 receives the additional information items from the server 232 and converts the additional information items transmitted by the server 232 into printing data in order to form an image. The additional information items received from the server 232 may comprise detailed information items. For example, the information items received from RFID tag 100 may be brief information items, and the additional information items received from the server may be detailed information items that correspond to the brief information items.

In addition, the control unit 216 can store the detailed information items received from the server 232 in the storage unit 214. The detailed information items stored in the storage unit 214 are formed into the image by the image forming unit 212, at any time, in response to a request from the user of the image forming apparatus 210.

FIG. 3 illustrates operation of an RFID tag according to an embodiment of the present general inventive concept.

In operation S300, the RFID tag receives a demand (i.e., a request) for transmission of stored information from an RFID reader/writer. In operation S302, the RFID tag transmits the stored information to the RFID reader/writer. The information transmitted by the RFID tag may include brief information items as well as an RFID tag identifier. A user may set the RFID tag in such a manner that only the RFID tag identifier is included in the transmitted information. Accordingly, the amount of information that is transmitted to the RFID reader/writer may be reduced. On the other hand, when information that is transmitted need not be reduced, the user may set the RFID tag in such that the brief information items as well as the RFID tag identifier are included in transmitted information.

FIG. 4 illustrates an operation of an image forming apparatus according to an embodiment of the present general inventive concept.

In operation S400, the information forming apparatus demands information stored in an RFID tag. In operation S402, the image forming apparatus receives the information stored in the RFID tag from the RFID tag. The image forming apparatus stores the information received from the RFID tag in a storage unit thereof. The image forming apparatus can store information items received from a plurality of RFID tags in a table format in order to differentiate the information items of the plurality of RFID tags from one another. Table 1 indicates information items stored in the storage unit, by way of an example.

TABLE 1

| RFID tag identifiers | Brief information items |
|---|---|
| RFID tag 1 | name, phone number, company name, e-mail, company home page |
| RFID tag 2 | movie title, leading actor/actress, release date |
| . . . | . . . |
| RFID tag 3 | producing district, producer, price, distribution term limit |

In operation S404, if the received information is an RFID identifier, the image forming apparatus transmits the received RFID identifier to a server. If the received information is an RFID identifier and brief information items, the image forming apparatus may transmit only the RFID identifier or one or more selected brief information items to the server. That is, if a display unit of the image forming apparatus displays the brief information items received from the RFID tag, a user may select one or more of the brief information items displayed on the display unit. By doing so, the image forming apparatus can reduce the amount of corresponding detailed information items received from the server. This function is described below.

In operation S406, the image forming apparatus receives one or more detailed information items from the server. That is, the image forming apparatus receives detailed information items corresponding to the brief information items received in the operation S404, and listed in Table 1 from the server. The image forming apparatus stores the received detailed information items in the storage unit according to a control command from a control unit of the image forming apparatus. Table 2 indicates detailed information items stored in the storage unit, by way of an example.

TABLE 2

| RFID tag identifiers | Detailed information items |
|---|---|
| RFID tag 1 | introduction of company, field of business, news |
| RFID tag 2 | still pictures or process of production, information needed for understanding movie |
| . . . | . . . |
| RFID tag 3 | greetings of producer, images concerning cultivation process, price, distribution route |

In operation S408, the image forming apparatus performs an image formation operation to one or more of the detailed information items received from the server.

The image forming apparatus may receive a list of detailed information items and/or the detailed information items themselves. If the display unit of the image forming apparatus displays the list of detailed information items, the user of the image forming apparatus may select one or more of the detailed information items. The selected detailed information items are transmitted to the control unit. The control unit sends a control command to the image forming apparatus to form one or more images corresponding to the selected detailed information items. As a result, the image forming apparatus may form only the one or more images corresponding to the one or more detailed information items selected by the user.

FIG. 5 illustrates operation of a server according to an embodiment of the present general inventive concept.

In operation S500, the server receives one or more information items from an image forming apparatus. The one or more received information items can include either an RFID identifier or the RFID identifier and one or more brief information items. The information items received from the image forming apparatus may, for example, correspond to those listed in Table 1.

In operation S502, the server extracts the list of detailed information items that correspond with the information items received from the image forming apparatus and the detailed information items themselves. The server stores the list of detailed information items and the detailed information items that correspond with the received information items. Alternatively, the server may read the list of detailed information items and the detailed information items that correspond with the received information items from a separate storage medium (e.g., a database).

In operation S504, the server transmits the list of detailed information items and the detailed information items extracted in operation S502 to the image forming apparatus.

Upon receiving only the RFID identifier from the image forming apparatus, the server transmits the detailed information items that correspond with the RFID identifier to the image forming apparatus. On the other hand, upon receiving brief information items and the RFID identifier from the image forming apparatus, the server transmits only the detailed information items that correspond with the brief information items to the image forming apparatus. As a result, it is possible to reduce the amount of detailed information items transmitted to the image forming apparatus from the server.

As described above, according to an embodiment of the present general inventive concept, it is possible to obtain one or more information items about a specific article (e.g., a visiting card, a poster, an agricultural product, or the like) having an RFID tag attached thereto by employing an RFID reader/writer in communication with an image forming apparatus. Furthermore, it is possible for a user of the image forming apparatus to obtain one or more additional information items about the specific article, at any time, by accessing a server that stores the additional information items about the specific article.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of forming an image that corresponds to an information item about an article in a system comprising an image forming apparatus and the article, the method comprising:

receiving information items about an article from an RFID tag;

selecting one or more of the information items to receive corresponding detailed information items thereof;

requesting, to a server, one or more detailed information items about the article that correspond to the selected one or more of the information items;

receiving the requested one or more detailed information items from the server; and forming one or more images corresponding to the received one or more detailed information items.

2. The method as claimed in claim 1, further comprising:

storing the information received from the RFID tag and the one or more detailed information items received from the server with a corresponding RFID tag identifier.

3. The method as claimed in claim 2, wherein the receiving of the information about the article from the RFID tag comprises receiving the corresponding RFID tag identifier.

4. The method as claimed in claim 2, wherein the receiving of the information items about the article from the RFID tag comprises receiving the corresponding RFID tag identifier and brief information items about the article.

5. The method as claimed in claim 4, wherein the requesting of the one or more detailed information items comprises:

selecting one or more brief information items from among the received brief information items; and transmitting the selected one or more brief information items to the server along with the corresponding RFID tag identifier.

6. The method as claimed in claim 5, wherein the receiving of the requested one or more detailed information items comprises receiving only detailed information items that correspond to the selected one or more brief information items from the server from among a plurality of detailed information items that correspond to the corresponding RFID tag identifier.

7. The method as claimed in claim 1, wherein the receiving of the requested one or more detailed information items comprises:

receiving the one or more detailed information items from the server along with a list of the one or more detailed information items; and displaying the received list of detailed information items.

8. The method as claimed in claim 7, wherein the forming of the one or more images of the received one or more detailed information items comprises:

selecting one or more detailed information items from the displayed list of detailed information items; and forming the one or more images of the selected one or more detailed information items.

9. The method as claimed in claim 1, wherein:

the article comprises one of a poster, a visiting card, and an agricultural item;

the received information comprises at least one of a name, a phone number, a company name, an email address, a homepage address, a movie title, a leading actor/actress, a release date, a producing district, a producer name, a price, and a distribution method; and the one or more detailed information items comprise at least one of an introduction of a company, a business field, news about a company, still pictures, a process of production of a movie, greetings from a producer, images showing a process of cultivation, and information about a distribution precedure.

10. The image forming apparatus as claimed in claim 9, wherein the RFID tag comprises a radio frequency chip having a memory to store at least one of an RFID tag identifier and one or more brief information items about the article.

11. The image forming apparatus as claimed in claim 9, wherein the article comprises a plurality of articles having a plurality of RFID tags.

12. The image forming apparatus as claimed in claim 9, wherein the server receives a request from the image forming apparatus for the one or more detailed information items, extracts the one or more detailed information items from a database according to the request, and transmits the one or more extracted detailed information items to the image forming apparatus.

13. The image forming apparatus as claimed in claim 12, wherein the request includes an RFID tag identifier and the one or more detailed information items include any detailed information item associated with the RFID tag identifier.

14. The image forming apparatus as claimed in claim 12, wherein the request includes an RFID tag identifier and one or more brief information items received from the RFID tag, and the one or more detailed information items include detailed information items that correspond to the one or more brief information items.

15. The image forming apparatus as claimed in claim 9, wherein the server comprises a database to store a plurality of detailed information items that correspond to a plurality of brief information items for a plurality of different articles.

16. The image forming apparatus as claimed in claim 9, wherein the RFID tag is one of an active tag and a passive tag.

17. The image forming apparatus as claimed in claim 9, wherein the image forming apparatus comprises a storage unit to store, in a table form, information received from a plurality of RFID tags attached to a plurality of articles and a plurality of detailed information items about the plurality of articles that correspond to the information received from the plurality of RFID tags.

18. The image forming apparatus as claimed in claim 17, wherein the table form includes an RFID tag identifier portion, a brief information item portion, and a detailed information item portion.

19. The image forming apparatus as claimed in claim 17, wherein the image forming apparatus enables a user to access the table form at any time to form an image of at least one of the plurality of detailed information items stored therein.

20. The method as claimed in claim 1, wherein the receiving of the information about the article comprises:
  receiving the information about the article from a plurality of RFID tags; and
  transmitting a radio wave to one or more of the plurality of RFID tags to request identification information of the article.

21. The method as claimed in claim 1, wherein:
  the receiving of the information items about the article from the RFID tag comprises:
    receiving an RFID tag identifier and a plurality of brief information items and displaying a list of the received brief information items; and
  the requesting of the one or more detailed information items about the article that correspond to the received information comprises:
    enabling a user to select one or more brief information items from the displayed list and requesting at least one detailed information item that corresponds to the selected brief information item from the server.

22. An image forming apparatus to form an image that corresponds to an information item about an article in a system comprising an image forming apparatus and the article, comprising:
  an RFID reader/writer to receive information about an article through an RFID tag;
  a control unit to request, to a server, one or more detailed information items about the article that correspond to the received information and to receive the requested one or more detailed information items;
  a storage unit to store the information received from the RFID tag and the one or more detailed information items received from the server along with a corresponding RFID tag identifier; and
  an image forming unit to form one or more images that correspond to the received one or more detailed information items.

23. The image forming apparatus as claimed in claim 22, wherein the information received from the RFID tag comprises the corresponding RFID tag identifier.

24. The image forming apparatus as claimed in claim 22, wherein the information received from the RFID tag comprises the corresponding RFID tag identifier and brief information items about the article.

25. The image forming apparatus as claimed in claim 24, further comprising:
  a display unit to display the received brief information items; and
  an input unit to receive an input selection of one or more brief information items from among the displayed brief information items,
  wherein the control unit transmits the selected one or more brief information items to the server along with the corresponding RFID identifier.

26. The image forming apparatus as claimed in claim 25, wherein only detailed information items that correspond to the selected one or more brief information items are received from the server from among a plurality of detailed information items that correspond to the corresponding RFID tag identifier.

27. The image forming apparatus as claimed in claim 22, wherein the control unit receives a list of the one or more detailed information items from the server along with the one or more detailed information items, and a display unit displays the received list of detailed information items.

28. The image forming apparatus as claimed in claim 27, wherein the image forming unit only forms images that correspond to detailed information items that are selected from the list displayed by the display unit.

29. The image forming apparatus as claimed in claim 10, wherein the image forming apparatus transmits a request to the RFID tag for information about the article stored in the RFID tag, receives the information from the RFID tag, transmits the at least one of the RFID tag identifier and the one or more brief information items to the server to request detailed information items associated with the at least one of the RFID tag identifier and the one or more brief information items, receives the requested detailed information items from the server, and forms the one or more images of the received detailed information items.

30. An image forming system, comprising:
  an article having an RFID tag;
  an image forming apparatus to request one or more detailed information items associated with user-selected information received from the RFID tag about the article, to receive the requested one or more detailed information items, and to form one or more images according to the received one or more detailed information items; and a server to transmit the requested one or more detailed information items to the image forming apparatus.

31. An image forming apparatus, comprising:
an RFID receiver and/or writer to receive an RF signal from an external device;
a control unit to generate a request signal containing user-selected information from the RF signal to a second external device and to receive detailed information corresponding to the user-selected information of the RF signal according to the request signal from the second external device; and
an image forming unit to form one or more images representative of the detailed information according to the user-selected information contained in the RF signal.

32. The image forming apparatus of claim 31, wherein the control unit receives an electrical signal containing the detailed information from the second external device.

33. The image forming apparatus of claim 31, wherein the first external device comprises an RFID tag to generate the RF signal.

34. A communication system to communicate with an image forming apparatus, the communication system comprising:
an RFID tag to be attached to an article, the RFID comprising:
a memory to store information about the article; and
a battery to supply electricity to generate one or more signals about the stored information;
a control unit to generate another signal corresponding to information selected by a user from the one or more signals and to transmit the other signal to a remote memory; and
an image forming apparatus to form an image according to the information contained in the one or more signals and additional information obtained from the remote memory in response to the other signal.

35. The communication system of claim 34, wherein the stored information comprises at least one of an RFID tag identifier and one or more brief information items about the article.

36. The communication system of claim 34, wherein the image forming apparatus comprises an RFID receiver to receive the one or more signals from the RFID tag and to control an image forming unit to form one or more images according to the received one or more signals.

37. An image forming apparatus, comprising:
an RFID receiver and/or writer to receive an RF signal transmitted from an external device, the RF signal containing an identifier of the external device;
a control unit to receive additional information about the RF signal from a second external device;
a storage unit to associatively store information received from the external device, information received from the second external device, and the identifier of the external device responsive to a signal from the control unit; and
an image forming unit to form one or more images representative of information in the storage unit associated with the identifier of the external device.

38. An image forming apparatus, comprising:
an RFID receiver and/or writer to receive an RF signal transmitted from an external device, the RF signal containing user-selectable information items; and
a control unit to store additional information about a corresponding one of the user-selectable information items in the RF signal, and to convert the additional information into printing data to form an image according to the converted printing data and information contained in the RF signal.

39. A method of presenting information on an article comprising:
receiving an RFID tag identifier and at least one brief information item from an RFID tag associated with the article;
transmitting at least the RFID tag identifier to a server to obtain corresponding detailed information items on the article;
transmitting the detailed information items to an image forming device; and
forming an image on the image forming device representative of the detailed information items.

40. An information presentation system comprising:
a wirelessly accessible memory to store abbreviated information descriptive of an article to which the wirelessly accessible memory is attached;
a server to store detailed information descriptive of the article;
a user interface to display the abbreviated information, to select at least one abbreviated information item responsive to a user input, and to display the detailed information corresponding to the selected abbreviated information item; and
a controller to request from the server the detailed information that corresponds to the selected abbreviated information item.

* * * * *